INVENTOR.
HUGH E. PRITCHARD
BY
Charles L. Willson
ATTORNEY

United States Patent Office 2,988,170
Patented June 13, 1961

2,988,170
AIR CLEANER AND SILENCER
Hugh Edwin Pritchard, Detroit, Mich., assignor to Fram Corporation, Providence, R.I., a corporation of Rhode Island
Filed Feb. 3, 1960, Ser. No. 6,516
1 Claim. (Cl. 183—71)

This invention relates to an air cleaner and silencer for the carburetor of motor vehicles, and more particularly to means for securing an air tight seal between the air filter cartridge and silencer housing.

The silencer herein contemplated comprises a metal shell constructed to house an air filter cartridge and to reduce the engine noises that reach the carburetor and silencer from the engine valves.

The air filter cartridge or cleaner herein contemplated is preferably formed of pleated paper arranged in the form of a cylinder or tube and having a plastic sealing cap at each end of such tube.

The silencer housing has an air inlet, or air outlet, and a central opening at its upper end through which the air filter cartridge can be inserted and removed. The silencer also has a cover that rests upon an end of the air filter cartridge and holds the cartridge in place.

The construction of the parts just described preferably is such that when the cartridge and cover are in place an air tight seal is formed between the cartridge and housing at each end of the cartridge to prevent air from bypassing the cartridge on its way to the carburetor. The construction is also such that an air tight seal is formed between the cartridge and surrounding housing to reduce the escape of engine valve noises into the atmosphere.

If care is taken to produce the silencer housing and air filter cartridge accurately to predetermine dimensions, it is a relatively simple matter to design those parts so that when the cover is secured in place the above mentioned seals are secured. However, in manufacturing such parts, and particularly the metal housing in large quantities, variations in dimensions occur due largely to the fact that the sheet metal used to produce such housing is likely to vary in hardness and gauge. As a result, the metal parts produced day-in and day-out from the same dies, when assembled to form the housing will produce housings of non-uniform height. In many cases these housings vary in height in mass production up to about one-tenth of an inch. This adds greatly to the problem of securing a tight seal between the cartridge and casing to lessen the escape of valve noises from the housing.

Having in mind the foregoing, the present invention resides in a novel construction whereby an air tight seal will be formed at each end of the cartridge and between the cartridge and surrounding housing when the cover is secured in place, and particularly in means whereby such seals are secured even if the highest of the housings varies substantially in a production run. Such seals are secured by providing the cartridge with end caps of flexible and compressible plastic material and by utilizing both the flexibility and compressibility of such plastic material to secure the desired seals.

The above and other features of the present invention will be further understood from the following description when read in connection with the accompanying drawing, wherein.

Figure 1:
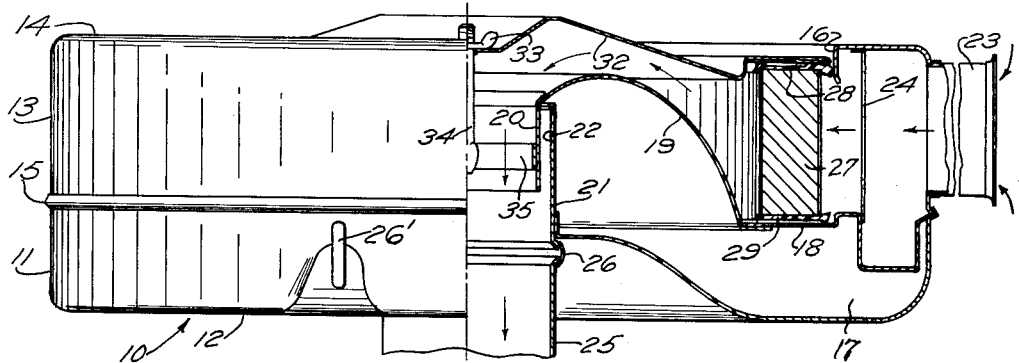
FIG. 1 is a side elevation with parts in section of an air cleaner and silencer embodying the construction of the present invention.

The housing in FIG. 1 of the drawing may vary extensively in construction so long as it cooperates with the ends of the cartridge as hereinafter described to obtain a tight air seal between the cartridge and cover and between the cartridge and housing.

The housing designated in its entirety by the numeral 10 comprises a lower outer wall 11 having an inwardly extending bottom wall 12 and an upper outer wall 13 having an inwardly extending top wall 14. The walls 11 and 13 are secured together by a rolled seam 15, and the upper wall 14 has a large central opening through which the air filter cartridge can be inserted. This opening is surrounded by a cylindrical portion 16 that extends downwardly a substantial distance from the wall 14.

The lower wall 12 and surrounding wall 11 form a resonator chamber 17 disposed below the cartridge supporting inner wall 18 that has the domed central portion 19. The outer peripheral portion of the wall 18 rests upon the lower wall 12 throughout a large arc. The dome portion 19 has a central opening and the downwardly extending tube 20 that forms an air conduit leading to the carburetor. Spaced from the tube 20 is the surrounding wall 21, the lower portion of which is secured to the upwardly extending central portion of the bottom wall 12. The tubular wall 21 is provided near its upper end with several slots 22 through which sound waves from the engine can enter the resonator chamber 17.

The silencer 10 has the laterally extending air inlet tube 23 of any desired length to deliver air from the atmosphere into this silencer and opposite the inner end of this tube 23 is mounted the arcuate baffle 24 positioned to prevent air entering through such tube from striking directly against the filter cartridge. The lower end of the tubular wall 21 is flared outwardly somewhat as shown to rest upon the similarly outwardly flared upper end of the air intake horn 25 of the engine carburetor. The silencer housing is secured in place upon the carburetor by the spanner ring 26 which is tightened about the flared end portions of tubes 21 and 25 by rotating the threaded member 26′.

The parts so far described, for the most part, are not essential to the present invention but have been shown and described to make clear the novel construction which will now be described.

As above stated, the silencer 10 has a large central opening in its top wall 14 through which a filter cartridge can be introduced. This cartridge preferably comprises an annular filter element 27 formed of porous pleated paper having the pleats extending parallel to the axis of the annulus. The upper end of the filter element is closed by a molded flexible plastic cap 28, such as plastisol and the lower end is closed by a similar molded flexible plastic cap 29. The pleated paper filter preferably has a protecting outer annular wall 30 of perforated metal and a similar inner wall 31.

When the filter cartridge is in place in the silencer 10, its lower end 29 rests upon the supporting inner wall 18, and is held in sealing engagement with this wall by the downward pressure of the cover 32 that rests upon the upper end cap 28. The cover is forced downwardly by screwing the thumb nut 33 downwardly upon the threaded post 34 attached to the interior of the sleeve 20 by the bridge bar 35.

Figure 2:
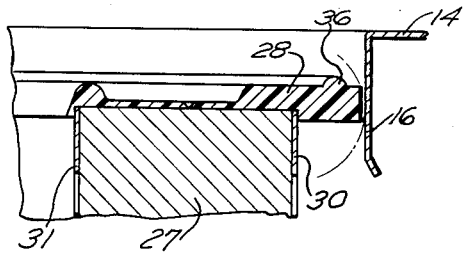
FIG 2 is a vertical sectional view through the upper end portion of the cartridge of FIG. 1 and some of the housings with the cover removed.

When the filter cartridge 27, 28, 29 is dropped into place within the silencer 10, so that its lower cap rests upon the wall 18, its upper cap 28 will lie within the downwardly extending ring 16 with its outer periphery close to the inner surface of such ring, as shown in FIG. 2. This construction provides for substantial variations in the height of the upper wall 14 from the cartridge supporting wall 18.

Figure 3:
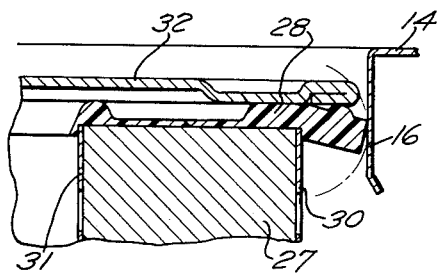
FIG. 3 is a similar view to FIG. 2 but with the cover exerting a sealing pressure on the cartridge.

If the cover 32 is forced downwardly against the cap 28 of the filter cartridge, it will form an air tight seal with such cap and it will also hold the lower cap 29 in sealing engagement with the supporting wall 18 to prevent the incoming air from leaking around either end of the cartridge. It is also important to secure an air tight seal between the outer periphery of the upper cap 28 and the inner surface of the wall 16 to prevent engine noises from escaping here. This is accomplished in the construction of FIGS. 1, 2 and 3 by providing on the upper face of the cap 28 the raised annular bead 36 adapted to be engaged by the cover 32. This bead forms a larger circle than the metal wall 30 so that the downward pressure on this bead by the cover will bend the protruding outer peripheral portion downwardly about the upper end of the metal wall 30 in the arc shown. In this manner the upper outer peripheral edge of the cap 28 is forced into sealing engagement with the bore of the tubular wall 16 to secure an air tight seal. After the cover 32 has bent the outer portion of the cap 28 downwardly, as shown in Fig. 3, it will rest upon the cap 28 above the tube 30 to hold the cartridge down in sealing relation with the lower wall 18.

Figure 4:
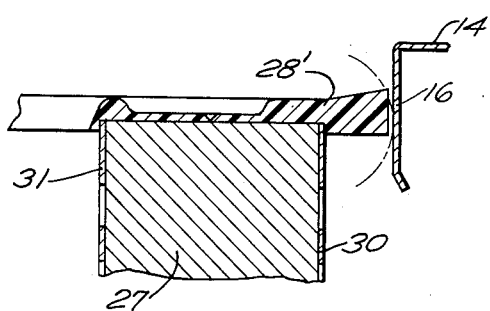
FIG. 4 is a view similar to FIG. 2 but shows a modified cartridge construction.
Figure 5:
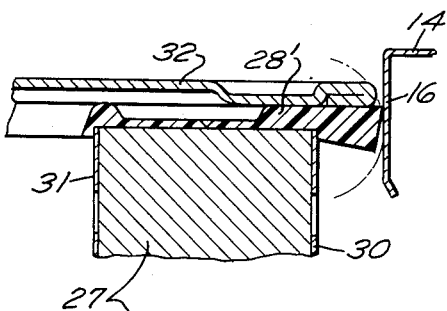
FIG. 5 shows the construction of FIG. 4 with the cover exerting a sealing pressure on the cartridge. This view also shows the lower end of the cartridge in section.
Figure 5:
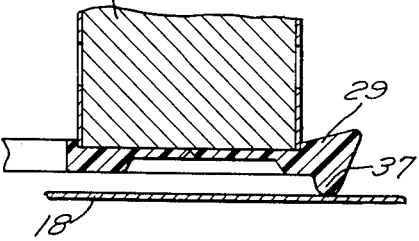

If desired the bead 36 may be omitted, in which case an air tight seal with the annular wall 16 can be secured by forming the upper cap 28 with a wedge shaped outer peripheral portion as shown in FIGS. 4 and 5, so that as the cover forces this outer peripheral portion downwardly it will swing through an arc to sealingly engage the bore of the wall 16. In all five views of the drawing the construction is such that both the resilient bending properties and compressive properties of the plastic end cap are utilized to secure the described seals.

If desired the lower end cap 29 may be provided with the downwardly extending bead-like portion 37 to secure a better seal with the supporting wall 18. This construction employs to a substantial degree both the resilient bending properties and compressive properties of the end cap 29.

It will be seen from the foregoing that by providing the upper wall of the silencer with the downwardly extending tubular wall 16 which surrounds the outer periphery of the upper end cap 28, a construction is provided that will accommodate substantial variations in the height of such wall, and by deflecting the outer peripheral portion of the upper end cap downwardly as shown to increase its diameter, an air tight seal is secured with the wall 16.

Having thus described my invention, what I claim and desire to protect by Letters Patent is:

An air filter and intake silencer assembly, comprising a silencer casing having a lower wall, a surrounding side wall and an inwardly extending top wall provided with a central opening surrounded by a portion that extends downwardly as a tube from the top wall; an air filter insertable in the silencer casing through said opening and comprising a pleated annular filter element having a lower end cap engageable with an inner surface of the silencer casing and a flexible upper end cap having an annular flange projecting laterally outwardly from the pleated filter element to fit the bore of said tube, a cover for said opening that rests on the air filter to hold it in place in the casing and large enough in diameter to engage said flange, an air inlet and air outlet for the casing, means for exerting a downward pressure on the cover to bend said flange downwardly in said bore and force the upper edge of its outer periphery into tighter sealing engagement with said bore while the lower end cap sealingly engages said surface, to thereby secure an air tight seal at both ends of the filter element even if the height of said element and silencer casing vary substantially relative to each other.

References Cited in the file of this patent

UNITED STATES PATENTS

| 2,871,976 | Sebok | Feb. 3, 1959 |
| 2,943,699 | Thornburgh | July 5, 1960 |

FOREIGN PATENTS

| 819,629 | Great Britain | Sept. 9, 1959 |